INVENTOR.
ELMER G. RULF

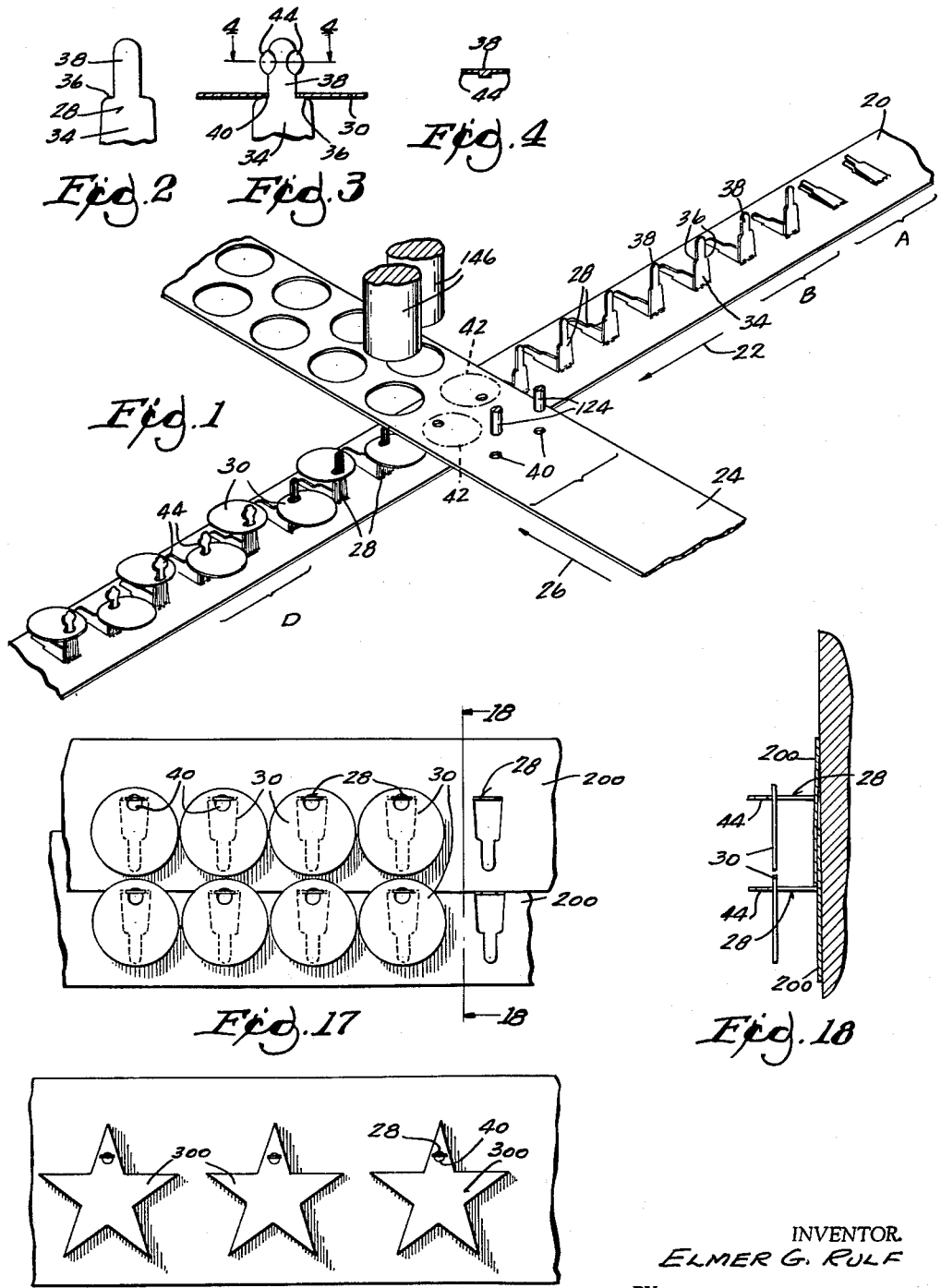

March 9, 1965 E. G. RULF 3,172,198
METHOD FOR THE PRODUCTION OF BANGLE
AND MOUNTING STRIP ASSEMBLIES
Filed April 30, 1962 5 Sheets-Sheet 4

INVENTOR.
ELMER G. RULF
BY
Wheeler, Wheeler & Wheeler
ATTORNEYS

March 9, 1965
E. G. RULF
3,172,198
METHOD FOR THE PRODUCTION OF BANGLE
AND MOUNTING STRIP ASSEMBLIES
Filed April 30, 1962
5 Sheets-Sheet 5
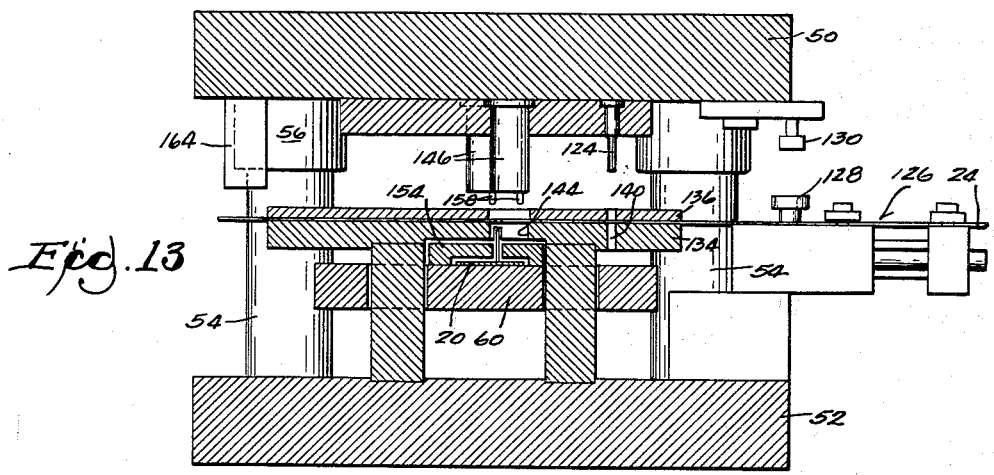
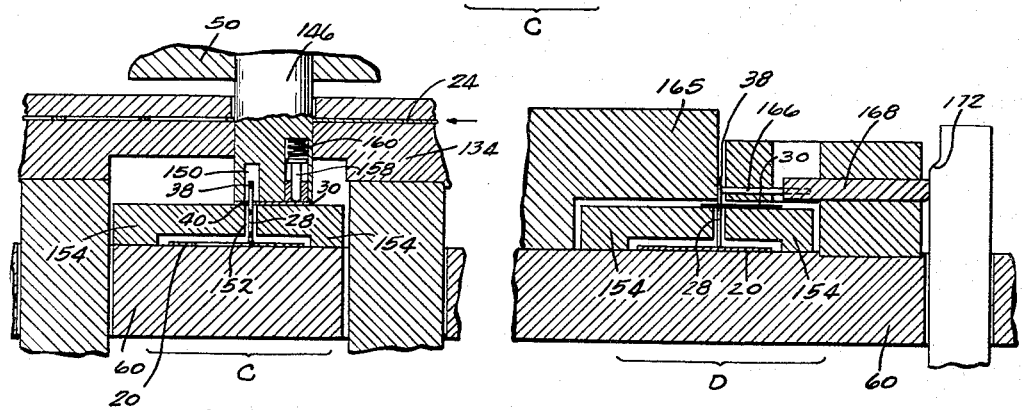
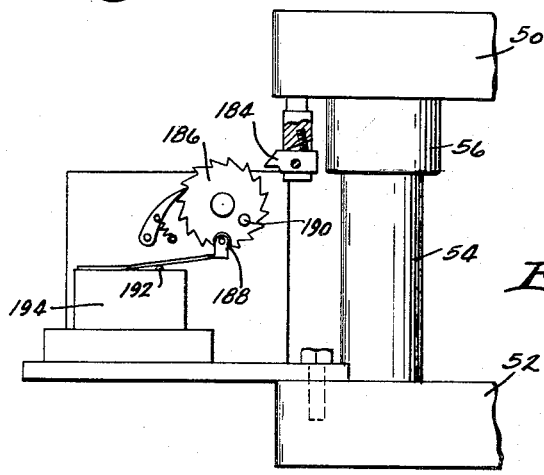
INVENTOR.
ELMER G. RULF
BY
Wheeler, Wheeler + Wheeler
ATTORNEYS United States Patent Office 3,172,198
Patented Mar. 9, 1965

3,172,198
METHOD FOR THE PRODUCTION OF BANGLE AND MOUNTING STRIP ASSEMBLIES
Elmer G. Rulf, Brookfield, Wis., assignor to Eldon Manufacturing Co., Inc., a corporation of Wisconsin
Filed Apr. 30, 1962, Ser. No. 190,988
4 Claims. (Cl. 29—416)

This invention relates to a method for the production a bangle and mounting strip assemblies.

The product is known as a motion strip. It comprises a strip of aluminum or other material having integral post portions projecting from the strip and supporting bangles of desired form which are usually designed to reflect light and are freely movable on the posts of the strip to produce a scintillating light reflecting effect as the bangles move in response to air currents. The product is new in detail. However, the present application is concerned primarily with a method of manufacture, whereby strips of stock material are fed at right angles to each other, posts being blanked from one strip and raised to project therefrom and bangles being blanked from the other strip and mounted on the respective posts in the same operation in which the blanking is done. Thereafter the ends of the posts are coined to retain the bangles. The supporting strip with the bangles mounted on its posts is delivered from the die in any desired length, the length being determinable by a cutoff mechanism which functions as a part of the die subject to the control of a counter.

In the drawings:

FIG. 1 is a diagrammatic view in perspective showing the sequence of operations involved in the completion of the desired product from the raw material.

FIG. 2 is a fragmentary detail view in elevation showing one of the shouldered posts formed to receive a bangle.

FIG. 3 is a view similar to FIG. 2 showing the bangle in place and the post coined to retain it.

FIG. 4 is a fragmentary detail view taken in section on the line 4—4 of FIG. 3.

FIG. 13 is a detail view on an enlarged scale taken on the line 13—13 of FIG. 5.

FIG. 14 is a fragmentary detail view on a greatly enlarged scale taken on the section of FIG. 13 but showing the parts in a different position, with portions broken away.

FIG. 15 is a fragmentary detail view on an enlarged scale taken on the section 15—15 of FIG. 7.

FIG. 16 is a view on an enlarged scale taken on the line 16—16 of FIG. 5, portions being broken away.

FIG. 17 is a front elevation showing an assembly of two motion strips made according to the method herein disclosed as they appear when mounted.

FIG. 18 is a view taken in section on the line 18—18 of FIG. 17.

FIG. 19 is an enlarged elevational view of a modified device embodying the invention.

Figure 6:
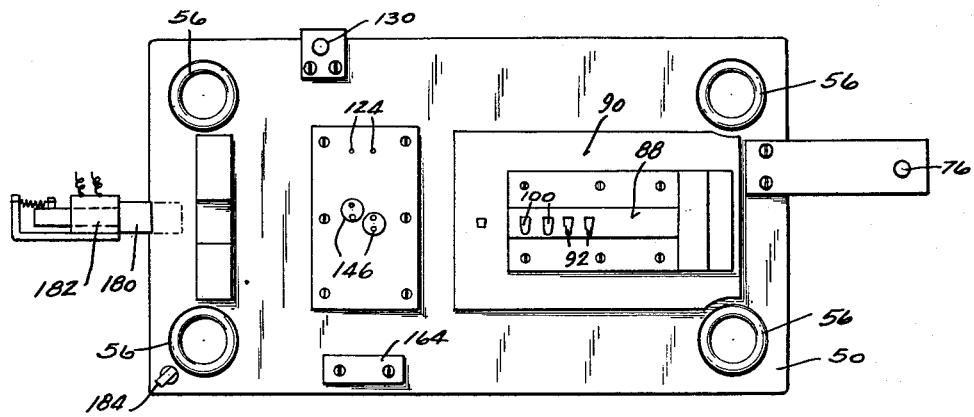
FIG. 6 is an inverted plan view of the top portion of the compound die.

Reference is made to the diagrammatic showing in FIG. 1. The mounting strip stock 20 is fed step by step in the direction indicated by arrow 22. The bangle strip stock 24 is fed step by step in the direction indicated by the arrow 26.

Each strip 20 is advanced by means of a conventional punch press feeder and the amount of advance is sufficient so that the posts and bangles are blanked out in pairs.

The posts 28 which receive the bangles 30 are first blanked out in the zone indicated at A and then raised to the desired position at right angles to the strip 20 as shown in the zone indicated at B. In subsequent operations the posts are rectified or straightened to stand precisely normal to the strip. Each of the posts comprises a base portion 34 having shoulders at 36 beyond which projects a terminal tongue portion 38 to receive the bangle 30.

During a dwell between steps of advance of the bangle strip 24 the strip is punched to provide a pair of holes 40 spaced at a distance from each other which is identical with the spacing between the tongues of a pair of posts projecting upwardly from mounting strip 20. During the dwell which follows a subsequent step of advance of the bangle strip 24, bangles are severed therefrom as indicated by the dotted lines 42 in FIG. 1. Although one of the bangles severed in each given operation is more advanced than the other, nevertheless each bangle includes one of the holes 40. As the respective bangles are severed they are forced downwardly over the underlying tongues of the posts registering with such holes, being thereby mounted on the tongues in the same operation in which they are severed from the bangle stock strip 24. This blanking and assembly of the bangles takes place in the zone indicated by reference character C in FIGS. 8, 13 and 14.

Figure 7:
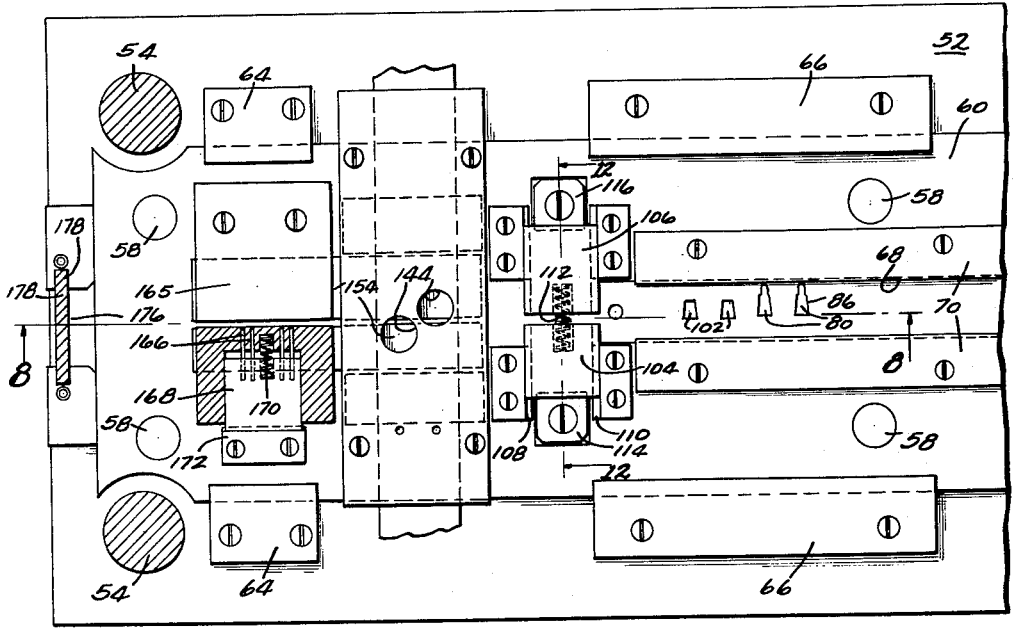
FIG. 7 is an enlarged fragmentary detail view showing a portion of the structure illustrated in FIG. 5.

In the area indicated at D in FIGS. 1 and 7 the ends of the tongues are coined as shown at 44 in FIGS. 3 and 4, thereby retaining each bangle upon the tongue portion 38 of its respective post. The bangles of each pair project in opposite directions from their respective posts, this being the position in which they are fed onto the tongues upon being blanked from the bangle strip 24. However, the bangles are free to arrange themselves in corresponding pendant positions when mounted as, for example, in FIG. 17.

The specific compound die structure and method of operation will now be described.

Figure 5:
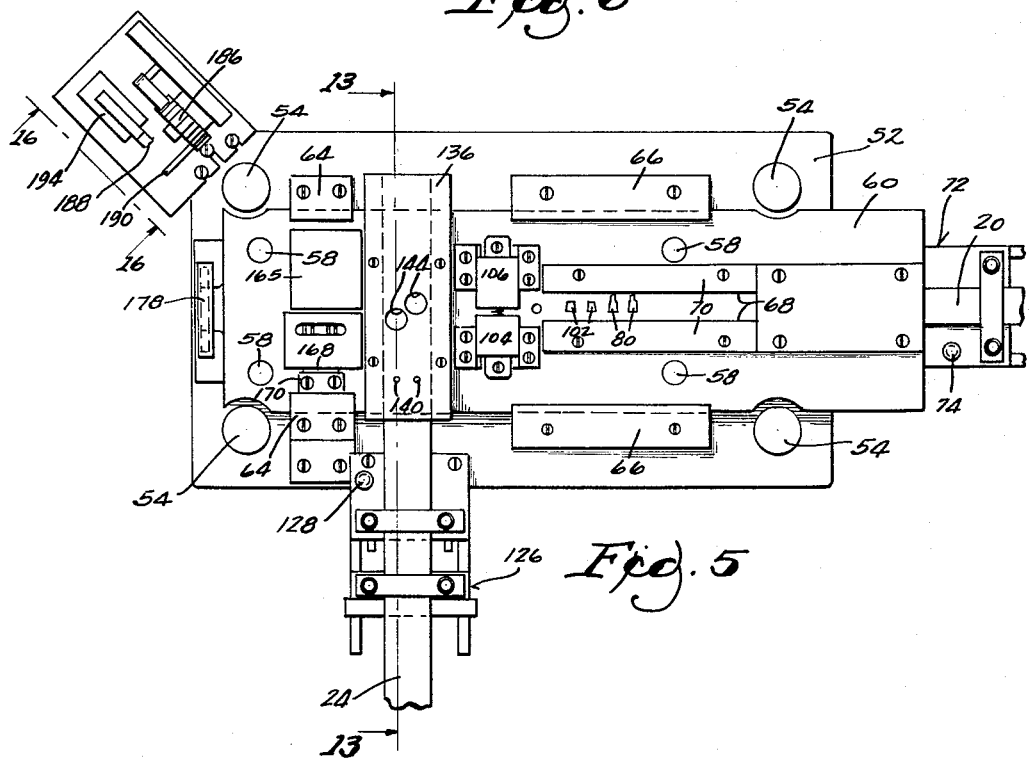
FIG. 5 is a plan view of the base portion of the compound die.
Figure 9:
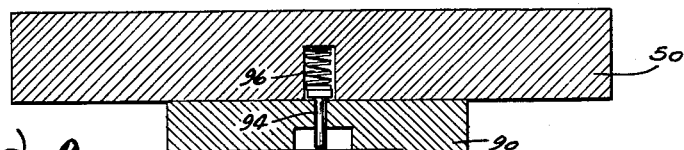
FIG. 9 is a view taken in section on the line 9—9 of FIG. 7.

It will be understood that the die set will be mounted in a punch press in the usual manner. It comprises relatively reciprocable upper and lower platens 50 and 52 which are shown separated in FIG. 6 and FIG. 5 and are relatively reciprocable. The lower platen 52 has leader pins 54 and the upper platen 50 has complementary bushings 56. Four auxiliary leader pins 58 guide for vertical reciprocation a yieldable table 60 biased upwardly by compression springs 62. The normal elevated position of the yieldable table 60 is defined by the stops 64 and 66 (FIG. 5 and FIG. 9). A shallow channel 68 overhung by plates 70 provides a way in which the mounting strip stock 20 is advanced by the feeder 72. Since this feeder is a conventional punch press feeder it is not described herein. It is pneumatic in operation and has a push button 74 operated by the finger 76 of the upper platen 50 to control the feeder for step by step advance and intermittent dwell of the work strip 20.

Figure 10:
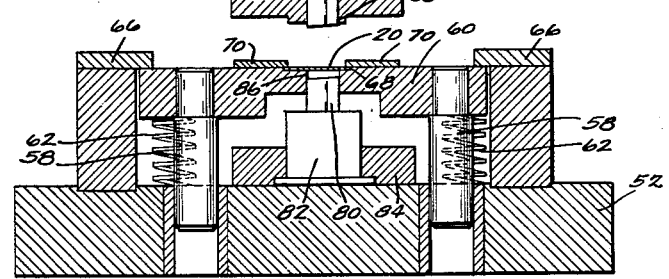
FIG. 10 is a fragmentary detail view taken on an enlarged scale on a section of FIG. 9 showing the parts in different relative positions.

In each dwell of strip 20 a pair of posts are blanked from the strip as shown at station A in FIG. 1. FIGS. 9 and 10 show the die and punch assembly for blanking each post. The punch 80 has a mount 82 connected by the anchoring means 84 with the lower platen 52. The floating table 60 has an aperture 86 within which the punch 80 is disposed immediately beneath the work strip 20.

The die 88 is carried by the mounting member 90 from the upper platen 50 and is arranged to project between the plates 70 which confine the work strip 20. Reciprocable within the die 88 is an ejector punch 92 biased downwardly by plunger 94 and spring 96 and yieldable upwardly against such bias to permit portions of the post 28 to be received into the die as such portions are blanked from the strip 20.

The blanking is done as the platen 50 approaches the platen 52. As best shown in FIG. 10 the punch 80 raises the tongue portion 38 of the post, forcing the auxiliary punch 92 upwardly into the die 88. When the die bottoms on the plates 70 the table 60 is depressed against its supporting springs 62.

Figure 11:
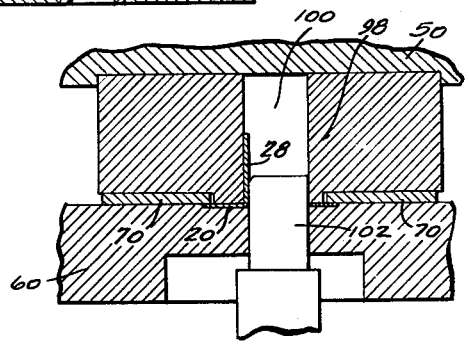
FIG. 11 is a detail view on an enlarged scale taken on line 11—11 of FIG. 8.

FIG. 11 shows a detail of the parts at station B. At this station the die 88 has an opening 100 into which the post 28 is erected by the fixed punch 102 as the die receives the punch.

Figure 12:
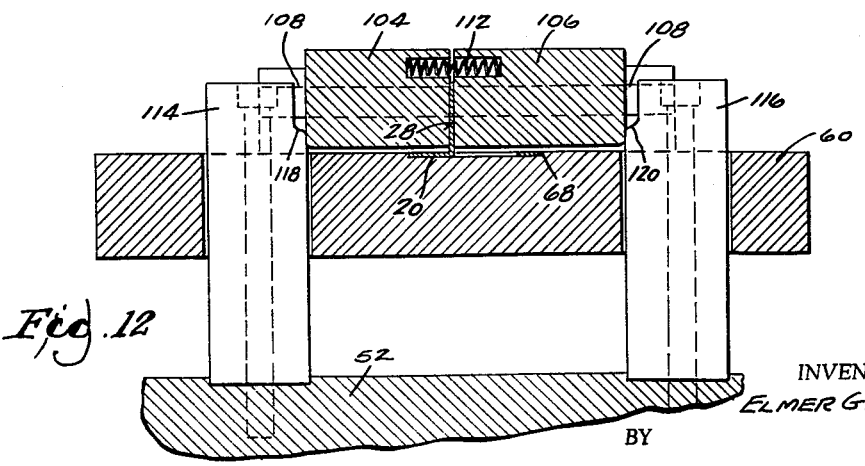
FIG. 12 is a detail view on an enlarged scale taken in section on the line 12—12 of FIG. 7.

As the work strip 20 continues to advance in the channel 68 of the floating table 60, the upstanding posts 28 are rectified in upright normal positions by a mechanism shown in FIG. 12. The clamp members 104, 106 are guided for lateral reciprocation in the ways 108, 110 (FIG. 7) and are normally biased apart by a compression spring 112 to enable successive posts 28 to pass freely between them when the clamp members 104, 106 are in the separated positions in which they are illustrated in FIG. 7. However, the bottom platen 52 is provided with fixed cams at 114 and 116 having cam surfaces 118, 120 which, in the descent of the floating table 60, engage the clamp members 104, 106 to force them together against the intervening posts 28 as shown in FIG. 12. This positively positions each post at right angles to the strip 20.

While the right angular position of the posts is preferred, any upstanding position will be satisfactory provided it exposes the ends to the holes of the bangles, and suspends the bangles for freedom of movement in use.

After each pair of posts leaves the clamping members, the second step by step advance of strip 20 will deliver the upstanding posts into registry with a pair of holes 40 of the bangle stock strip 24. The holes 40 have been made in strip 24 by punches 124 connected with the upper platen 50. The bangle stock strip 24 has a feeder 126 of conventional design which is preferably a pneumatic feeder comparable to that shown at 72. It has a control button at 128 engaged by the actuator 130 mounted on the upper platen 50. As the bangle stock strip 24 is advanced by the feeder it passes over a fixed table 134 which bridges the floating table 60. The confining member 136 resting on the fixed table 134 provides a way at 138 through which the bangle stock strip 24 is advanced as shown in FIG. 13. The fixed table has a die opening at 140 into which the punch 124 is received when the platen 50 descends, thereby punching the openings 40 to receive the tongue portions of the posts.

The fixed table 134 and the overlying way-forming member 136 are also provided with openings 144 to receive the punches 146 for blanking out the bangles. As already described, the openings 144 are offset in the manner best shown in FIG. 7 and the punches 146 are correspondingly offset, thereby permitting the bangles to be blanked from the stock strip 24 without undue loss of material. The offset is such that one of each pair of holes 40 will lie just within the more advanced margin of one of the bangles and the other hole of each pair will lie just within the trailing margin of the laterally and forwardly offset bangle.

Each of the bangle blanking punches 146 has a socket at 150 registering with and adapted to receive the tongue portion 38 of one of the posts 28. In the positions of the parts shown in FIGS. 13 and 14 the tongue portion 38 is projecting through a slot 152 in a guide member 154 which overlies the supporting strip 20. As each blanking punch 146 descends through the hole 144 of the die table 134, it pushes the severed bangle 30 ahead of it and engages the bangle opening 40 over the tongue 38 of one of the posts 28 as shown in FIG. 14. Each punch 146 also carries an ejector 158 biased downwardly by a spring 160 which is compressed in the position of the parts shown in FIG. 14 and reacts as the punch is withdrawn, thereby forcing the bangle to stay on the tongue 38 of the post.

As a convenient means of disposing the waste from strip 24, from which the bangles have been blanked, I prefer to use a waste cutoff die 164 which has shearing movement with respect to the die table 134 to cut the waste into short lengths. A length of projecting waste is shown in FIG. 13 just prior to being severed.

As the mounting strip 24 continues its step by step advance, the successive bangles 30 move along the surface of member 154, being supported just above the shoulders 36 of the respective posts 28. At station D the tongues 38 are coined to retain the bangles. At one side of the path of the advancing posts, at station D, is an anvil 165 (FIGS. 7 and 15). Each tongue 38 rests flat against the side face of the anvil and is engaged by a pair of coining punches 166 mounted in a plunger 168 that is biased by a spring 170 to a normally retracted position from which the plunger is advanced by a cam 172 when the floating table 60 is forced downwardly. These pairs of coining punches flatten the respective tongues to produce the coined areas 44 as shown in FIGS. 3 and 4 and above described.

Figure 8:
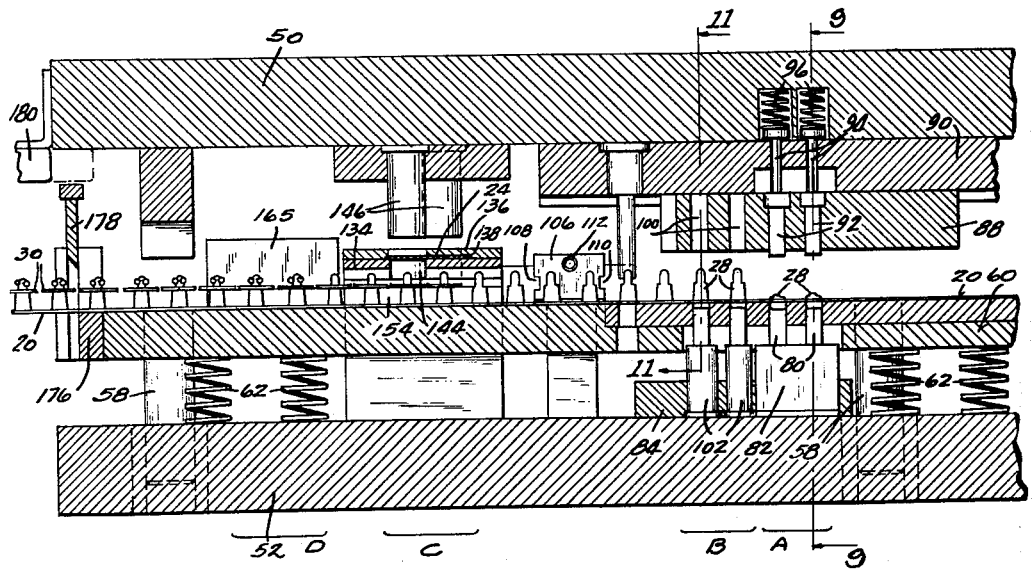
FIG. 8 is a view taken in section on the line 8—8 of FIG. 7.

The mounting strip 20 with the bangles mounted upon the posts will issue in any desired length up to the total length of the roll of stock. Usually the bangle strips are severed into pre-determined lengths by means of relatively fixed and movable shear blades 176, 178 (FIG. 8). It will be observed that the movable shear blade 178 normally floats free of the upper platen 50. However, a normally retracted solenoid armature 180 may be advanced from the full line position of FIG. 6 to the dotted line position of FIG. 6 when the solenoid 182 is energized. In the dotted line position of the armature 180 shown in FIG. 8, the armature intervenes between the platen 50 and the movable shear 178 so that the platen will actuate the shear to sever a given length of the mounting strip 20. This length is conveniently determinable by means of the counting device shown in FIG. 16.

A pawl 184 connected with platen 50 advances ratchet wheel 186 one tooth with every downward reciprocation of platen 50. According to the number of teeth in the selected interchangeable ratchet wheel, a given number of reciprocations of the platen will result in engagement of a cam follower roller 188 by means of a laterally projecting pin 190 on the ratchet wheel, thereby operating the actuator 192 of a switch 194 to energize the solenoid 182, thus severing a length of mounting strip.

Any number of severed lengths 200 may be mounted as shown in FIGS. 17 and 18 with a degree of overlap such that the vertical spacing between the bangles 30 may, if desired, approximate the lateral spacing between the post-mounted bangles. Any desired number of mounting strips may be associated in this manner so that the bangles will virtually cover any desired vertical surface area. Each bangle will have limited freedom of universal movement on the tongue portion 38 of its respective post 28, being confined by the coined ears 44 against loss from the post. If the bangles have specular light reflecting surfaces either clear or in color, interesting shimmering effects result as the bangles move about in air currents.

In addition to the circular bangles shown at 30, it is contemplated that the bangles may take any desired form, this being exemplified by the stars shown at 300 in FIG. 19. Simply by changing the blanking punches 146 and the complementary openings 144 of the die table 134 the bangles may be made in any given contour, within the capacity of the device.

I claim:

1. A method of manufacturing a motion strip having projecting posts with bangles mounted thereon, such method comprising the steps of
   partially blanking and erecting successive posts upon a strip of stock,
   moving a second strip of stock across the first mentioned strip and
   blanking apertured bangles from the second strip in registry with previously erected posts of the first step and pressing apertured portions of the respective bangles upon the erected posts in the same operation in which the bangles are blanked.

2. A method according to claim 1 including the step of forming apertures in the second strip prior to the blanking of the bangles therefrom and
   blanking the bangles in positions which are offset respecting the apertures, the respective apertures being adjacent opposite margins of the respective bangles as the bangles are blanked from the second strip.

3. A method of producing a bangle mounted on a post, said method comprising the steps of
   forming a post having a tongue portion,
   punching an aperture in a piece of bangle stock,
   blanking from such stock a bangle which includes the aperture, and in the same operation continuing the movement of said bangle and
   pressing the apertured portion of the bangle onto the tongue portion of the post.

4. A method according to claim 3 followed by the step of flattening a generally planiform part of the tongue portion of the post and thereby reducing the thickness of the tongue portion and laterally displacing material thereof sufficiently to increase its width to exceed the diameter of the aperture whereby to anchor the bangle permanently on the tongue portion.

References Cited in the file of this patent

UNITED STATES PATENTS

| | | |
|---|---|---|
| 2,076,956 | Lowenstein | Apr. 13, 1937 |
| 2,204,592 | Heftler | June 18, 1940 |
| 2,319,766 | Cox et al. | May 18, 1943 |
| 2,966,757 | Faulk | Jan. 3, 1961 |
| 3,026,608 | Holcombe | Mar. 27, 1962 |
| 3,085,324 | Nelson | Apr. 26, 1963 |